(12) United States Patent
Bagagli et al.

(10) Patent No.: US 10,253,765 B2
(45) Date of Patent: Apr. 9, 2019

(54) VALVES WITH VALVE CLOSING MEMBER ATTACHED TO THE ACTUATED COUNTER-SEAT AND RELATED METHODS

(71) Applicant: NUOVO PIGNONE S.p.A., Florence (IT)

(72) Inventors: Riccardo Bagagli, Firenze (IT); Leonardo Tognarelli, Firenze (IT)

(73) Assignee: NUOVO PIGNONE S.P.A., Florence (IT)

( * ) Notice: Subject to any disclaimer, the term of this patent is extended or adjusted under 35 U.S.C. 154(b) by 547 days.

(21) Appl. No.: 13/714,460

(22) Filed: Dec. 14, 2012

(65) Prior Publication Data
US 2013/0160641 A1 Jun. 27, 2013

(30) Foreign Application Priority Data
Dec. 22, 2011 (IT) .............................. CO2011A0072

(51) Int. Cl.
*F04B 39/10* (2006.01)
*F15B 21/00* (2006.01)
(Continued)

(52) U.S. Cl.
CPC ............ *F04B 39/1053* (2013.01); *F04B 7/00* (2013.01); *F04B 35/01* (2013.01); *F04B 39/08* (2013.01);
(Continued)

(58) Field of Classification Search
CPC .... F16K 25/00; F16K 1/44; Y10T 137/87265; Y10T 137/2562; Y10T 29/49238;
(Continued)

(56) References Cited

U.S. PATENT DOCUMENTS 3,602,247 A * 8/1971 Bunn .................. F04B 39/1013
137/270
3,892,384 A * 7/1975 Myers ...................... F16K 1/44
251/282
(Continued)

FOREIGN PATENT DOCUMENTS

CN 101153587 A 4/2008
CN 101835985 A 9/2010
(Continued)

OTHER PUBLICATIONS

Search Report and Written Opinion from corresponding Italian application No. CO2011A000072, dated Aug. 14, 2012.
(Continued)

*Primary Examiner* — Matthew W Jellett
*Assistant Examiner* — Christopher Ballman
(74) *Attorney, Agent, or Firm* — GE Global Patent Operation; Marc A. Vivenzio

(57) ABSTRACT

A valve assembly in a reciprocating compressor used in oil and gas industry is provided. The valve assembly comprises an actuator configured to a valve actuating motion and a valve. The valve has a valve seat comprises an inlet port configured to allow a fluid to flow through the valve seat, a counter-seat comprising an outlet port configured to allow the fluid to flow through the counter-seat, and a valve closing member attached to the counter-seat and configured to cover the inlet port when the counter-seat is in a closed position. The counter-seat is configured to receive the valve actuating motion and to move between the closed position and an open position in which the valve closing member does not cover the inlet port thereby selectively allowing the fluid to flow on a flow path which comprises the inlet port and the outlet port.

20 Claims, 6 Drawing Sheets

(51) Int. Cl.
 F16K 25/00 (2006.01)
 F04B 7/00 (2006.01)
 F04B 35/01 (2006.01)
 F04B 39/08 (2006.01)
 F16K 1/44 (2006.01)

(52) U.S. Cl.
 CPC .......... *F04B 39/1026* (2013.01); *F15B 21/00* (2013.01); *F16K 1/44* (2013.01); *F16K 25/00* (2013.01); *Y10T 29/49238* (2015.01)

(58) Field of Classification Search
 CPC .. F04B 39/1053; F04B 39/1026; F04B 39/08; F04B 7/00; F04B 35/01; F15B 21/00
 USPC .............................. 137/110, 599.01; 251/213
 See application file for complete search history.

(56) References Cited

U.S. PATENT DOCUMENTS

| | | | | |
|---|---|---|---|---|
| 4,483,363 | A * | 11/1984 | Madoche et al. | 137/329.04 |
| 4,799,507 | A | 1/1989 | Hrabal | |
| 4,924,906 | A * | 5/1990 | Hrabal | F04B 39/1033 |
| | | | | 137/512.1 |
| 5,025,828 | A | 6/1991 | Lin | |
| 5,067,506 | A * | 11/1991 | Ball | F16K 1/221 |
| | | | | 137/1 |
| 5,320,136 | A * | 6/1994 | Morris | F16K 15/021 |
| | | | | 137/516.29 |
| 5,623,957 | A * | 4/1997 | Lekholm | A61M 5/14216 |
| | | | | 137/246 |
| 6,000,417 | A * | 12/1999 | Jacobs | F16K 15/023 |
| | | | | 137/2 |
| 6,149,400 | A | 11/2000 | Samland et al. | |
| 6,425,356 | B1 | 7/2002 | Pischinger et al. | |
| 6,539,909 | B2 * | 4/2003 | Yager | 123/188.8 |
| 7,819,131 | B2 * | 10/2010 | Walpole | 137/533.23 |
| 8,584,698 | B2 * | 11/2013 | Brun et al. | 137/487.5 |
| 9,017,457 | B2 * | 4/2015 | Tammera | F16K 11/00 |
| | | | | 95/103 |
| 9,027,459 | B2 * | 5/2015 | Spiegl | F04B 7/0076 |
| | | | | 91/45 |
| 9,039,387 | B2 | 5/2015 | Mellar | |
| 9,377,018 | B2 * | 6/2016 | Mangiagli | F04B 49/06 |
| 2001/0001477 | A1 | 5/2001 | Steinebrunner et al. | |
| 2002/0187057 | A1 * | 12/2002 | Loprete et al. | 417/313 |
| 2003/0183073 | A1 * | 10/2003 | Lilie | 91/394 |
| 2004/0000656 | A1 * | 1/2004 | Wiggins et al. | 251/289 |
| 2008/0080995 | A1 | 4/2008 | Inoue | |
| 2008/0178946 | A1 | 7/2008 | Lea-Wilson et al. | |
| 2010/0140519 | A1 | 6/2010 | Kopecek et al. | |
| 2010/0247359 | A1 | 9/2010 | Hauri et al. | |

FOREIGN PATENT DOCUMENTS

| | | | |
|---|---|---|---|
| CN | 201851313 U | 6/2011 | |
| EP | 0971160 | 1/2000 | |
| JP | 2000055212 A | 2/2000 | |
| JP | 2002530602 A | 9/2002 | |
| JP | 2009299799 A | 12/2009 | |
| RU | 13407 U1 | 4/2000 | |
| SU | 1257346 A1 | 9/1986 | |
| WO | 2009023011 | 2/2009 | |
| WO | WO 2012118757 A1 * | 9/2012 | .............. F16K 11/00 |

OTHER PUBLICATIONS

Unofficial English translation of Office Action issued in connection with corresponding CN Application No. 201210560041.7 dated Dec. 23, 2015.
Russian Notice of Allowance issued in connection with corresponding RU Application No. 2012155750 dated Nov. 17, 2016.
Unofficial English Translation of Japanese Search Report issued in connection with corresponding JP Application No. 2012277540 dated Feb. 8, 2017.
Japanese Office Action issued in connection with corresponding JP Application No. 2012277540 dated Apr. 8, 2017.
Machine translation and Japanese Notice of Allowance issued in connection with corresponding JP Application No. 2012277540 dated Oct. 31, 2017.

* cited by examiner

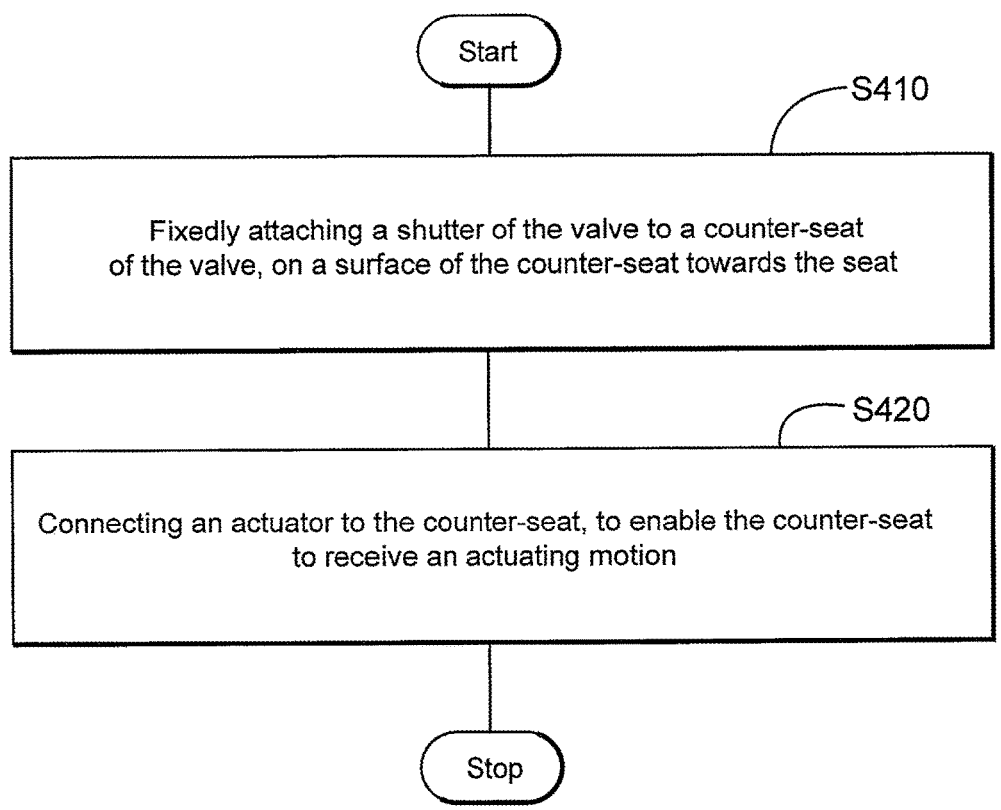

VALVES WITH VALVE CLOSING MEMBER ATTACHED TO THE ACTUATED COUNTER-SEAT AND RELATED METHODS

BACKGROUND OF THE INVENTION

Embodiments of the subject matter disclosed herein generally relate to actuated valves used in reciprocating compressors for oil and gas industry, and, more particularly, to mechanisms and techniques related to valves in which valve closing members are attached to actuated counter-seats.

Compressors are mechanical devices used to increase the pressure of a gas and can be found in engines, turbines, power generation, cryogenic applications, oil and gas processing, etc. Due to their widespread use, various mechanisms and techniques related to compressors are often subject to research for improving the compressor efficiency and solving problems related to specific situations. One particularity that has to be considered for compressors used in oil and gas industry is that the compressed fluid is frequently corrosive and inflammable. American Petroleum Institute (API), the organization setting the recognized industry standard for equipment used in oil and gas industry has issued a document, API618, listing a complete set of minimum requirements for reciprocating compressors.

The compressors may be classified as positive displacement compressors (e.g., reciprocating, screw, or vane compressors) or dynamic compressors (e.g., centrifugal or axial compressors). For positive displacement compressors, the compression is achieved by trapping the gas and then reducing volume in which the gas is trapped. For dynamic compressors, the gas is compressed by transferring kinetic energy, typically from a rotating element such as an impellor, to the gas being compressed by the compressor.

FIG. 1 is an illustration of a conventional dual chamber reciprocal compressor 10 useable in oil and gas industry. Compression occurs in a cylinder 20. A fluid to be compressed (e.g., natural gas) is input into the cylinder 20 via an inlet 30, and, after being compressed, it is output via an outlet 40. The compression is a cyclical process in which the gas is compressed by movement of the piston 50 along the cylinder 20, between a head end 26 and a crank end 28 of the cylinder 20. In fact, the piston 50 divides the cylinder 20 in two compression chambers 22 and 24 operating in different phases of the compression cycle, the volume of compression chamber 22 being at its lowest value when the volume of the compression chamber 24 is at its highest value and vice-versa.

Suction valves 32 and 34 open to allow the fluid that is going to be compressed (i.e., having a first pressure $p_1$) from the inlet 30 and through the suctions valves 32 and 34 into the compression chambers 22 and 24, respectively. Discharge valves 42 and 44 open to allow the fluid that has been compressed (i.e., having a second pressure $p_2$) to be output from the compression chambers 22 and 24, respectively, via the outlet 40. The piston 50 moves due to energy transmitted from a crankshaft 60 via a crosshead 70 and a piston rod 80.

Conventionally, the suction and the compression valves used in a reciprocating compressor are automatic valves that are switched between close and open due to a differential pressure across the valve. FIGS. 2A and 2B illustrate the operation of an automatic valve 100 having a seat 110 and a counter-seat 120. A distance d between the seat 110 and the counter-seat 120 is constant throughout the compression cycle (for example, a spacer 115 may be located therebetween). FIG. 2A illustrates the valve 100 in an open state and FIG. 2B illustrates the valve 100 in a close state.

In the open state illustrated in FIG. 2A, the valve closing member 130 is pushed down into the counter-seat 120 allowing the fluid to flow through a inlet port 140 and outlet ports 150. The shape of the valve closing member 130 may be a disc, a poppet, multi-poppet or rings, which difference in shape gives the name of the valve: disc valve, poppet valve, multi-poppet valve or ring valve. FIGS. 2A and 2B represent a generic configuration independent of the details related to the actual shape of the valve closing member 130. FIG. 3 illustrates components of a ring valve which operate as in FIGS. 2A and 2B: the seat 110 and the counter-seat 120 having circular openings of the ports 140 and 150 on their surfaces, springs 160 on the counter-seat 120 and rings 131 (which are the valve closing member).

In FIG. 2A, a spring 160 is located between the valve closing member 130 and the counter-seat 120. Depending on its state of deformation, the spring 160 actively participates in establishing a valve opening point, the elastic deformation force superimposing a pressure along the flow path equal to the force divided by the area of the valve closing member 130. In the open state, the first pressure $p_1$ before the inlet port 140 is larger than the pressure $p_2$ at the destination of the fluid after the outlet ports 150. If the spring 160 is deformed when the valve closing member 130 is pushed down into the counter-seat 120 (as shown in FIG. 2A), the difference ($p_1-p_2$) between the pressures before and after the valve has to be larger than the pressure due to the spring 160 (i.e., a ratio of the elastic deformation force divided by the area of the valve closing member).

In the close state illustrated in FIG. 2B, the valve closing member 130 prevents the fluid flowing from the inlet port 140 towards the outlet ports 150. The spring 160 is often configured to favor a faster closing of the valve, and, therefore, it is known as a "return" spring closing the valve 100 even if the pressures at the source $p_1$ and the destination $p_2$ are equal ($p_1=p_2$).

As described above, the valves in a reciprocating compressor may be switched between the open state and the close state due to the pressure difference between the pressure $p_1$ at the source of the fluid and the pressure $p_2$ at the destination of the fluid. The springs are used to accelerate the switching between the open and close states, while the pressure difference across the valve ($p_1-p_2$) may change dynamically. Alternatively, the valve closing member may be actuated by an electromagnetic or hydraulic actuator applying a force to move the valve closing member.

The spring is a part of the valves that frequently fails, affecting reliability of the valve, and, thus, of the whole reciprocating compressor. Additionally, in time, fluttering may occur, that is asymmetries due to the springs may disrupt the motion of the valve closing member allowing leakage. When actuators are used, the force due to the spring may have to be overcome by the actuator force in some situations occurring during the valve operation.

Further, one inefficiency to the reciprocating compressor is related to the clearance volume, that is, a volume from which the compressed fluid cannot be evacuated. Part of the clearance volume is due to volume related to the valves. A design objective is to make this clearance volume as small as possible.

Accordingly, it would be desirable to provide valves without springs that avoid the afore-described problems and drawbacks.

BRIEF DESCRIPTION OF THE INVENTION

Embodiments of the inventive concept set forth in this application have one or more of the following advantages:

valves useable in reciprocation compressors for oil and gas industry that do not include springs that frequently fail, are thinner and have an increased flow area.

According to one exemplary embodiment, a valve assembly in a reciprocating compressor used in oil and gas industry. The valve assembly comprises an actuator configured to provide a valve actuating motion and a valve. The valve has a valve seat comprising an inlet port configured to allow a fluid to flow through the valve seat, a counter-seat comprising an outlet port configured to allow the fluid to flow through the counter-seat, and a valve closing member attached to the counter-seat and configured to cover the inlet port when the counter-seat is in a closed position. The counter-seat is configured to receive the valve actuating motion and to move between the closed position and an open position in which the valve closing member does not cover the inlet port thereby selectively allowing the fluid to flow on a flow path which comprises the inlet port and the outlet port.

According to another exemplary embodiment, a reciprocating compressor is provided. The reciprocating compressor comprises an actuator configured to provide a valve actuating motion, and a valve. The valve has a valve seat comprising an inlet port configured to allow a fluid to flow through the valve seat, a counter-seat comprising an outlet port configured to allow the fluid to flow through the counter-seat, and a valve closing member attached to the counter-seat and configured to cover the inlet port when the counter-seat is in a closed position. The counter-seat is configured to receive the valve actuating motion and to move between the closed position and an open position in which the valve closing member does not cover the inlet port thereby selectively allowing the fluid to flow on a flow path which comprises the inlet port and the outlet port.

According to another exemplary embodiment, a method of retrofitting a compressor initially having a valve with a spring between a valve closing member and a counter-seat of the valve, the valve initially configured to actuate due to a differential pressure, wherein the valve closing member is attached to the counter-seat of the valve is provided. The method includes fixedly attaching the valve closing member to the counter-seat of the valve, and connecting an actuator to the counter-seat to enable the counter-seat to receive an actuating motion to move between a closed position in which the valve closing member covers an inlet port through a seat of the valve and an open position in which the valve closing member does not cover the inlet port.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a flow chart illustrating a method for retrofitting a compressor to have a valve with valve closing member attached to the counter-seat according to an exemplary embodiment.

DETAILED DESCRIPTION OF EXEMPLARY EMBODIMENTS OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of reciprocating compressor used in oil and gas industry. However, the embodiments to be discussed next are not limited to these systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to overcome the problems caused by the springs in the valves used in reciprocating compressor for oil and gas industry, in some embodiments the valve closing member is attached to the counter-seat to be moved together by an actuator thereby opening and closing the valve. Removing the springs lowers the number of parts of the valve and removes one of the parts most prone to fail or to induce failure of the other parts (e.g., fluttering of the ring in a ring valve).

Figure 4A:
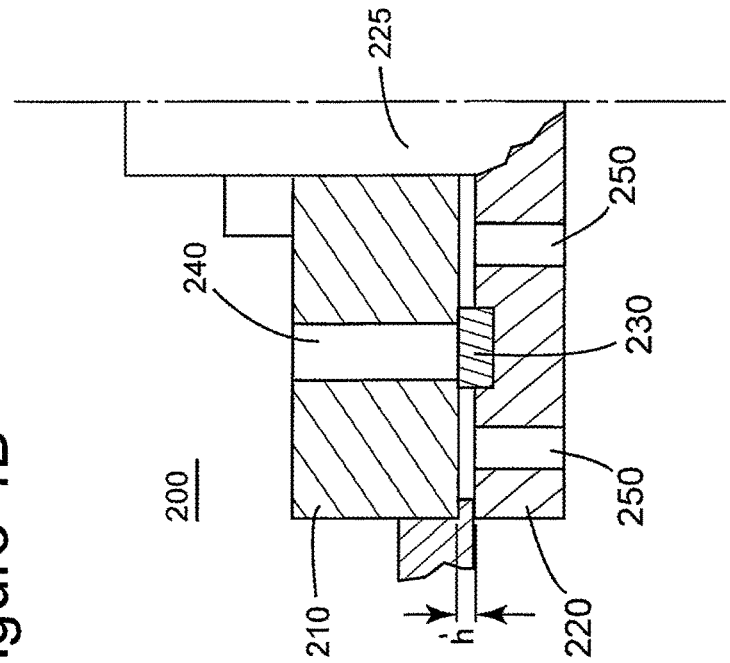
FIGS. 4A and 4B are schematic diagrams illustrating operation of a valve according to an exemplary embodiment.
Figure 4B:
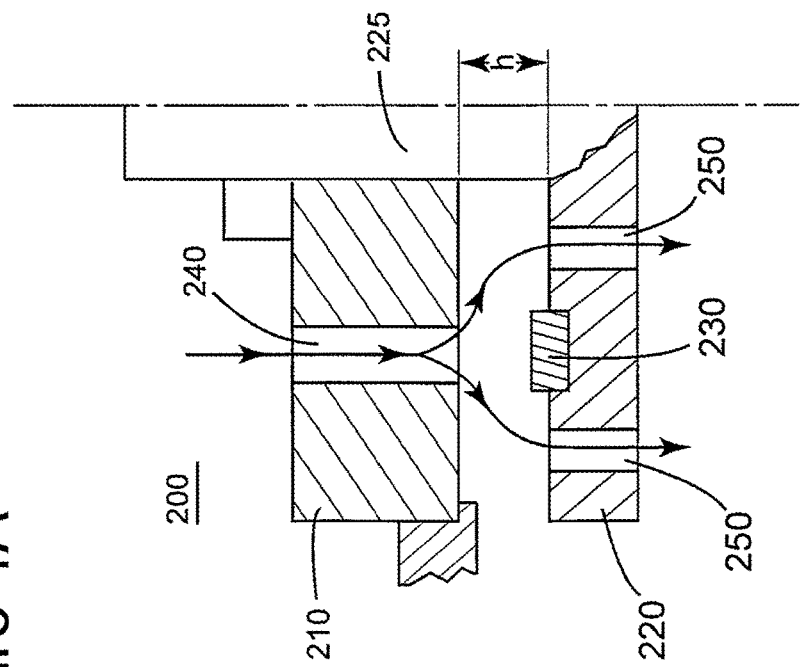

FIGS. 4A and 4B illustrate the operation of an automatic valve 200 according to an exemplary embodiment. The automatic valve 200 has a seat 210 and a counter-seat 220 moving jointly with a stem 225. A valve closing member 230 is attached to the counter-seat 220. FIG. 4A illustrates the valve 200 in an open state and FIG. 4B illustrates the valve 200 in a close state.

In the open state illustrated in FIG. 4A, the valve closing member 230, which is attached to the counter-seat 220, is positioned away from the seat 210 allowing the fluid to flow via (1) an inlet port 240 through the seat 210, (2) a space between the seat 210 and the counter-seat 220, and (3) outlet ports 250 through the counter-seat 220. The shape of the valve closing member 230 may be a disc, a poppet, multi-poppet or rings, which difference in shape gives the name of the of valve: disc valve, poppet valve, multi-poppet valve or ring valve. FIGS. 4A and 4B represent a generic configuration independent of the details related to the actual shape of the valve closing member 230.

The inlet port 240 and the outlet port(s) 250 may pass through the seat 210 and the counter-seat 220, respectively, along substantially parallel directions. However, this parallel orientation is not a requirement.

The valve seat and the counter-seat may be made of metallic material (e.g., stainless steel and alloy steel). The counter seat may also be made of composite material which is lighter than the metallic material. The valve closing member may be made of a non-metallic material such as polyether ether ketone (PEEK) or stainless steel. In one embodiment, the valve closing member and the counter-seat may be formed as a single piece, for example made of stainless steel. In another embodiment, the valve closing member may formed separately from (and from a different material than) the counter-seat and attached to the counter-seat.

In one embodiment, as illustrated in FIGS. 4A and 4B, the counter-seat may have a groove inside which the valve closing member is placed, a height of the groove being smaller than a height of the valve closing member. In another embodiment, the valve closing member may be glued, attached with screws or welded to the counter-seat (depending also of the material used to manufacture the valve closing member).

One of the advantages of the actuated valve with the valve closing member attached to the counter-seat is that an enlarged flow area may be achieved while a smaller distance is created between the seat and the counter-seat to open the valve. Thus, the clearance volume due to the valve may be reduced.

In the close state illustrated in FIG. 4B, the valve closing member 230 with the counter-seat 220 has been moved towards the seat 210 for a distance h' (marked on FIG. 4A) so the valve closing member covers an opening of the inlet port 240 through the seat 210, thereby preventing the fluid from flowing through the valve. Note that the distance h' may be smaller than a maximum distance h between the seat 210 and the counter-seat 220 when the valve is open, because the valve closing member 230 may protrude from the surface of the counter-seat 220 towards the seat 210. In one embodiment, the valve closing member 230 and the surface of the seat 210 towards the counter-seat 220 may be machined such as to fit together so that h'=0.

During a compression cycle, the pressure difference between the source of the fluid ($p_1$) and the destination of the fluid ($p_2$) may vary. The valve being an actuated valve, the actuator may be controlled to change the timing of the valve opening or closing (making it earlier or later than when automated valves are used) in order to increase the compressor's efficiency.

Since the valve closing member 230 is attached to the counter-seat 220, no ring fluttering (i.e., deformations) occurs. This shape stability, further allows designing the profile of the valve closing member 230 or the seat 220, particularly around the opening of the inlet port 240 towards the counter-seat 220 such that to lower the flow resistance. The flow resistance to fluid flow passage is given (in a first approximation) by a product of the viscosity of the fluid and the length of the path. The corners prolong the path and thus increase the resistance. Shorter path may be achieved by designing the valve closing member 230 and/or the opening of the inlet port 240 towards the counter-seat 220 to have smooth curved shapes instead of the corners thereby lowering the flow resistance.

Figure 5:
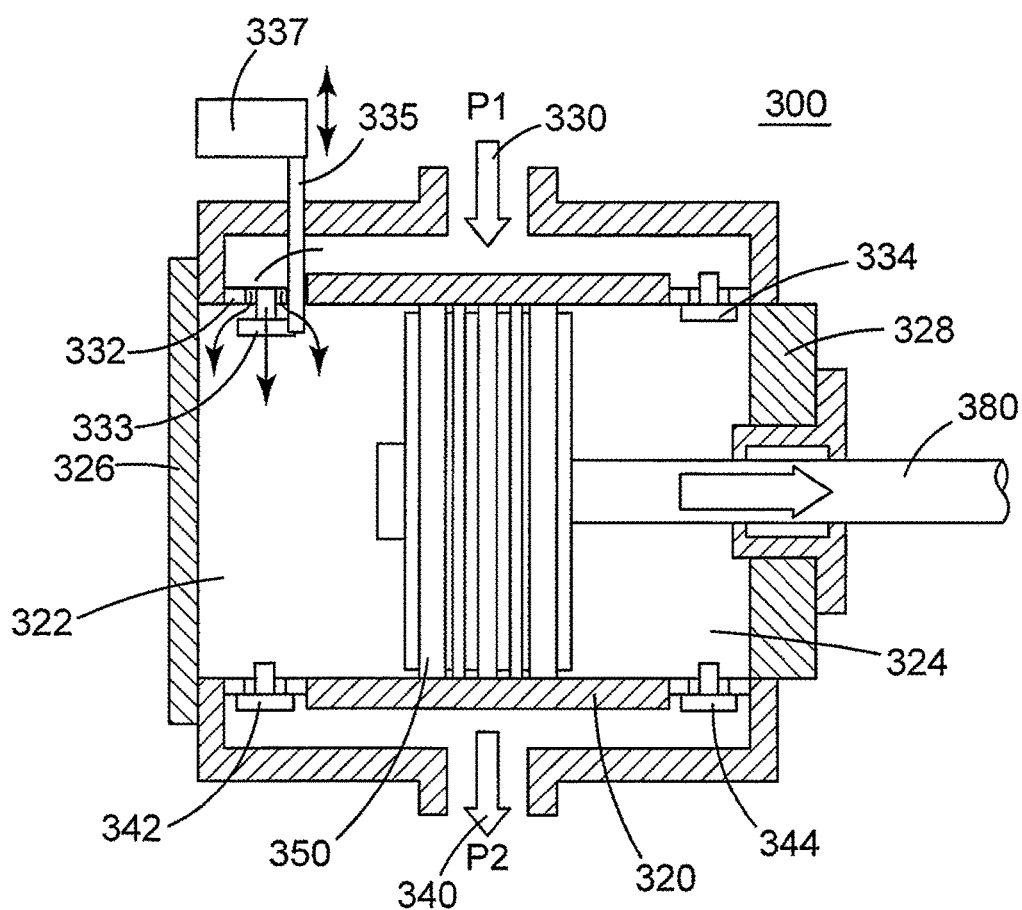
FIG. 5 illustrates a reciprocating compressor according to an exemplary embodiment.

FIG. 5 illustrates a reciprocating compressor 300 having one or more valves similar to the valves illustrated in FIGS. 4A and 4B. The compressor 300 is a dual chamber reciprocating compressor. However, valves according to embodiments may be used also in single chamber reciprocating compressors. The compression occurs in a cylinder 320. A fluid to be compressed (e.g., natural gas) is input into the cylinder 320 via an inlet 330, and, after the compression, is output via an outlet 340. The compression occurs due to the back-and-forth movement of the piston 350 along the cylinder 320, between a head end 326 and a crank end 328. The piston 350 divides the cylinder 320 in two compression chambers 322 and 324 operating in different phases of the compression cycle, the volume of compression chamber 322 being at its lowest value when the volume of the compression chamber 324 is at its highest value and vice-versa.

Suction valves 332 and 334 open to allow the fluid that is going to be compressed (i.e., having a first pressure $p_1$) from the inlet 330 into the compression chambers 322 and 324, respectively. Discharge valves 342 and 344 open to allow the fluid that has been compressed (i.e., having a second pressure $p_2$) to be output from the compression chambers 322 and 324, respectively, via the outlet 340. The piston 350 moves due to energy received for example from a crankshaft (not shown) via a crosshead (not shown) and a piston rod 380.

At least one of the valves 332, 334, 342 and 344 is a valve with valve closing member attached to the counter-seat as illustrated in FIGS. 4A and 4B. In FIG. 5, valve 332, which is a suction valve, is illustrated to be an actuated valve with the valve closing member attached to the counter-seat. However, actuated valves with valve closing member attached to the counter-seat may be used as discharge valves (e.g., 342, 344) as well. In fact, all the valves 332, 334, 342 and 344 may be actuated valves with valve closing member attached to the counter-seat.

The counter-seat 333 of the valve 332 is attached to a stem 335, which moves (in a vertical direction in FIG. 5) due to an actuator 337. According to one embodiment, the actuator 337 is located outside the fluid path to avoid the danger of explosions cause by sparks in the inflammable fluid.

The valve closing member may include one or more disc shaped parts or one or more ring shaped parts. The opening shapes of the ports correspond to the type of valve. For example, in a ring valve, the inlet port comprises a plurality of first concentric ports having a first set of diameters, the outlet port comprises a plurality of concentric outlet ports having a second set of diameters, any diameter of the first set is different from any diameter of the second set, and the valve closing member comprises a plurality of rings, that covers all the first concentric ports, when the valve is closed.

Valves with springs currently used in reciprocating compressors in oil and gas industry may be retrofitted to include one or more actuated valves having the valve closing member attached to the respective counter-seat. A flow diagram of a method 400 to retrofit a reciprocating compressor is illustrated in FIG. 6. The method 400 includes fixedly attaching the valve closing member to the counter-seat on a surface of the counter-seat towards the seat, at S410. Further, the method includes connecting an actuator to the counter-seat, to enable the counter-seat to receive an actuating motion to move between a closed position in which the valve closing member covers an inlet port through a seat of the valve, and an opened position in which the valve closing member does not cover the inlet port, at S420.

Figure 1:
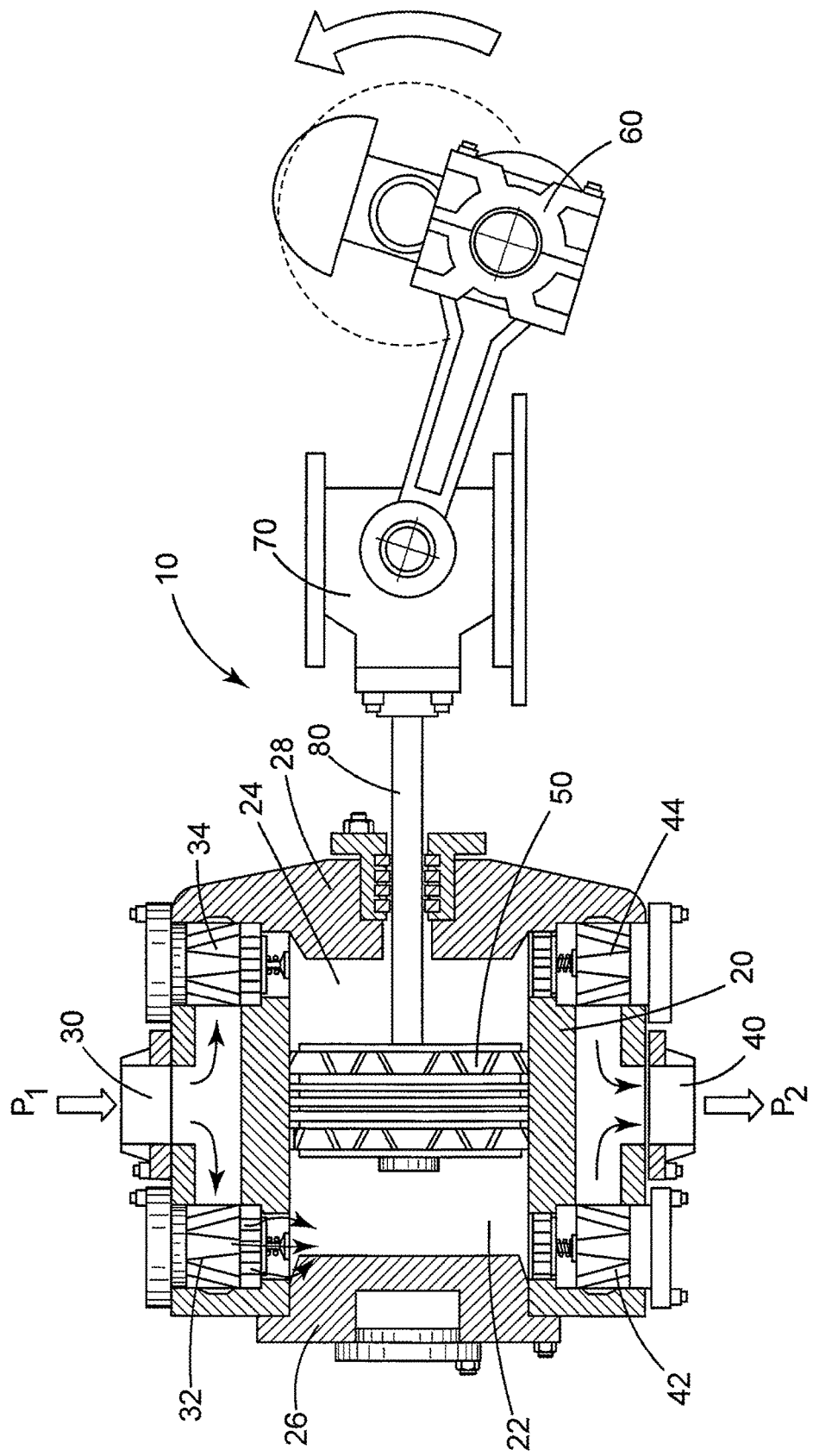
FIG. 1 is a schematic diagram of a conventional dual chamber reciprocal compressor.
Figure 2A:
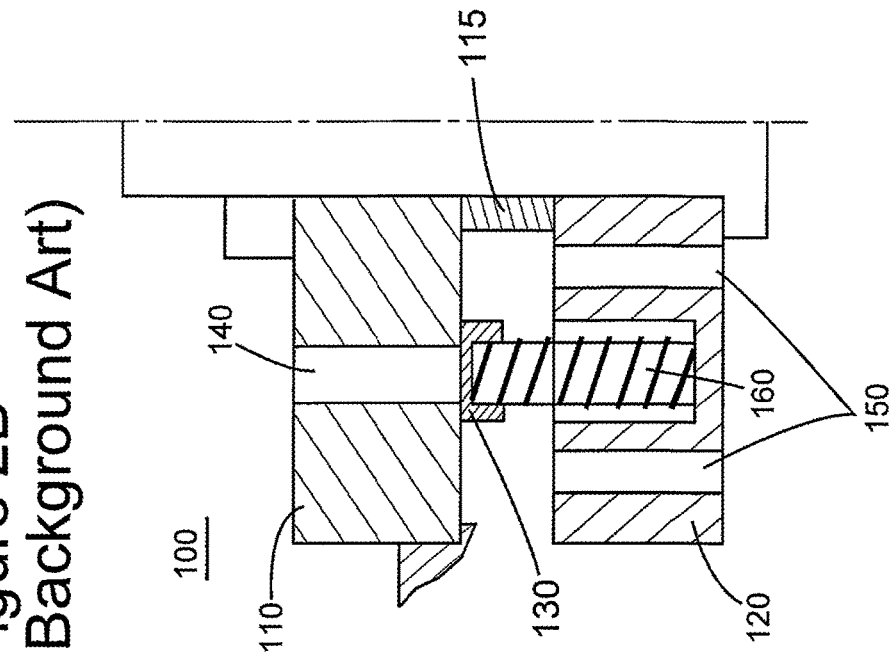
FIGS. 2A and 2B are schematic diagrams illustrating operation of an automatic valve.
Figure 2B:
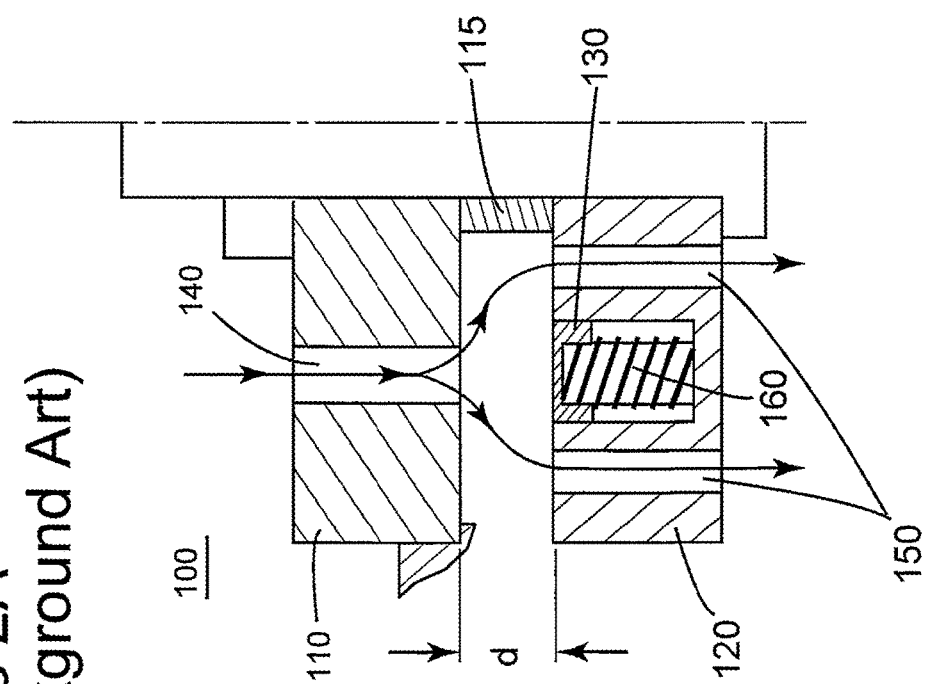
Figure 3:
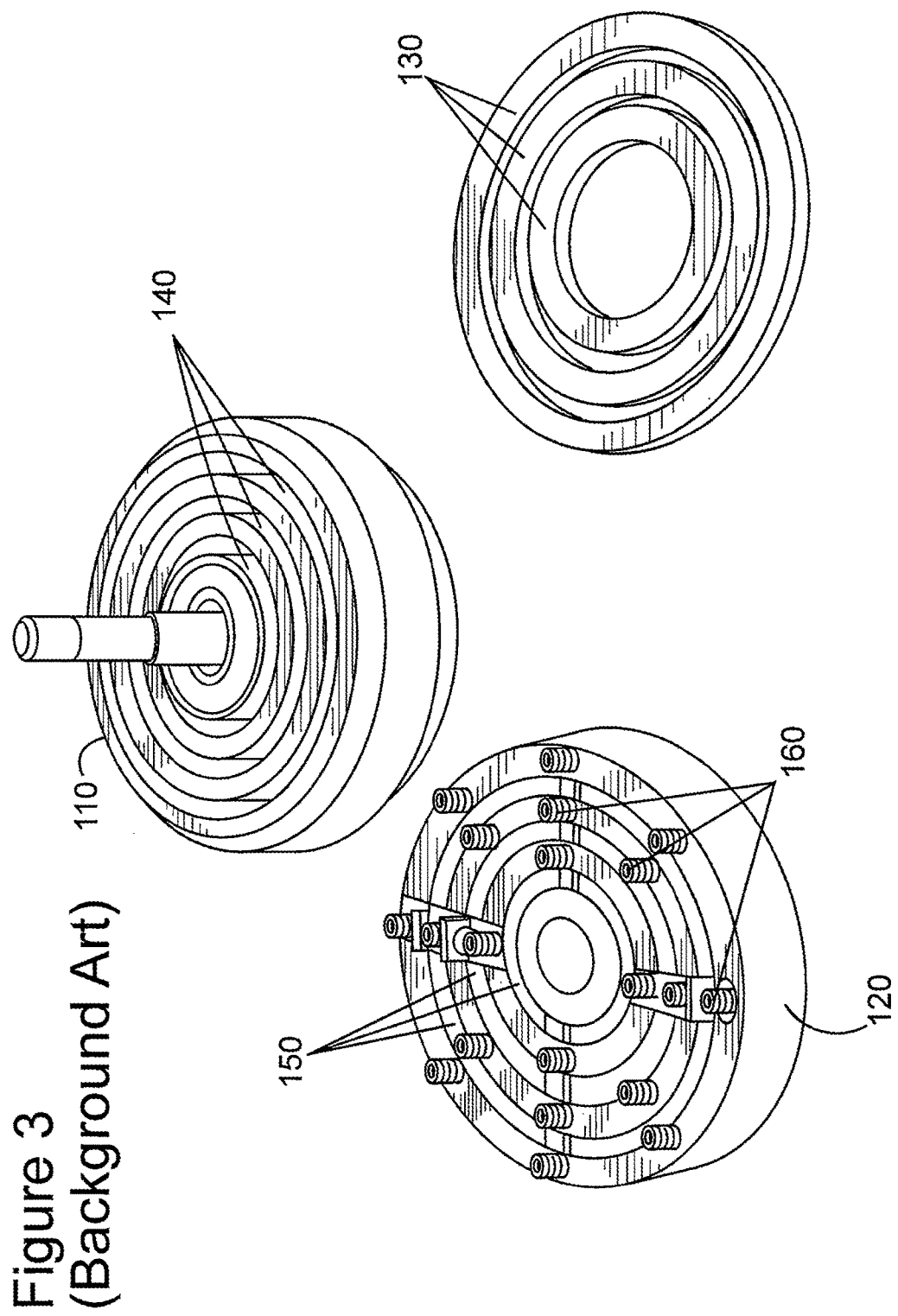
FIG. 3 is an illustration of components of a conventional ring valve.

The method 400 may further include removing a spring between the counter-seat and the valve closing member before attaching the valve closing member to the counter-seat, and/or removing a spacer (such as 115 in FIGS. 2A and 2B) originally located between the seat and the counter-seat. The method 400 may also include adding the actuator to the reciprocating compressor if the original valve was an automated valve (i.e., without an actuator).

The disclosed exemplary embodiments provide valve assemblies without springs and reciprocating compressors using these valve assemblies. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

Thus, while there has been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A valve assembly used in a reciprocating compressor, the valve assembly comprising:
    an actuator configured to provide a force; and
    a valve comprising:
        a valve seat comprising an inlet port configured to allow a fluid to flow through the valve seat;
        a counter-seat comprising an outlet port configured to allow the fluid to flow through the counter-seat;
        a stem attached to the counter-seat and the actuator; and
        a valve closing member attached to the counter-seat and configured to cover the inlet port when the counter seat is in a closed position, wherein the counter-seat is configured to receive the valve actuating motion from the actuator and to move between the closed position and an open position in which the valve closing member does not cover the inlet port thereby selectively allowing the fluid to flow from the inlet port of the valve seat to the outlet port of the counter seat and further from the outlet port of the counter seat directly to the compression chamber, and
    wherein the valve closing member is formed separately from the counter-seat and attached thereof,
    wherein the counter-seat moves jointly with the actuator.

2. The reciprocating compressor of claim 1, wherein the counter-seat is configured to have a groove inside which the valve closing member is placed, a height of the groove being smaller than a height of the valve closing member.

3. The reciprocating compressor of claim 1, wherein the valve closing member is glued, attached with screws or welded to the counter-seat.

4. The reciprocating compressor of claim 1, wherein at least one of an opening of the inlet port on a surface of the seat towards the counter-seat and the valve closing member has a profile shaped to lower flow resistance along the flow path.

5. The valve assembly of claim 1, wherein the valve closing member is fixedly attached to the counter-seat.

6. The valve assembly of claim 1, wherein the valve closing member and the counter-seat are movable together between the closed position and the open position.

7. The valve assembly of claim 1, wherein the counter-seat is coupled to the actuator via the stem that moves in a vertical direction to allow the counter-seat to move between the closed position and the open position.

8. The valve assembly of claim 1, wherein the actuator configured to move the counter-seat is not a spring.

9. The valve assembly of claim 1, wherein the valve closing member protrudes from a surface of the counter-seat towards the seat.

10. The valve assembly of claim 1, wherein the counter-seat comprises a groove inside which the valve closing member is placed.

11. A reciprocating compressor, comprising:
    an actuator configured to provide a valve actuating motion;
    a compression chamber; and
    a valve comprising:
        a valve seat comprising an inlet port configured to allow a fluid to flow through the valve seat;
        a counter-seat comprising an outlet port configured to allow the fluid to flow through the counter-seat;
        a stem attached to the counter-seat and the actuator; and
        a valve closing member attached to the counter-seat and configured to cover the inlet port when the counter seat is in a closed position, wherein the counter-seat is configured to receive the valve actuating motion from the actuator and to move between the closed position and an open position in which the valve closing member does not cover the inlet port thereby selectively allowing the fluid to flow from the inlet port of the valve seat to the outlet port of the counter seat and further from the outlet port of the counter seat directly to the compression chamber,
    wherein the valve closing member is formed separately from the counter-seat and attached thereof,
    wherein the counter-seat moves jointly with the actuator.

12. The reciprocating compressor of claim 11, wherein the valve closing member comprises one or more disc shaped parts.

13. The reciprocating compressor of claim 11, wherein the valve closing member comprises one or more ring shaped parts.

14. The reciprocating compressor of claim 11, wherein the valve closing member is fixedly attached to the counter-seat.

15. The reciprocating compressor of claim 11, wherein the valve closing member and the counter-seat are movable together between the closed position and the open position.

16. The reciprocating compressor of claim 11, wherein the counter-seat is coupled to the actuator via the stem that moves in a vertical direction to allow the counter-seat to move between the closed position and the open position.

17. The reciprocating compressor of claim 11, wherein the actuator is located outside the valve.

18. The reciprocating compressor of claim 11, wherein the actuator configured to move the counter-seat is not a spring.

19. A method of retrofitting a compressor initially having a valve with a spring between a valve closing member attached to a counter-seat of the valve, wherein the valve is initially configured to actuate due to a differential pressure, the method comprising:

fixedly attaching the valve closing member to the counter-seat of the valve;

connecting an actuator to the counter-seat to provide a force to the counter-seat to move the counter-seat between a closed position in which the valve closing member covers an inlet port through a seat of the valve and an open position in which the valve closing member does not cover the inlet port and to provide a force to the counter-seat to move the counter-seat from the open position to the closed position, wherein the valve closing member is formed separately from the counter-seat and attached thereof, wherein the counter-seat moves jointly with the actuator.

20. The method of claim 19, further comprising removing a spring between the counter-seat and the valve closing member before attaching the valve closing member to the counter-seat.

* * * * *